United States Patent [19]
Coleman et al.

[11] Patent Number: 6,013,690
[45] Date of Patent: *Jan. 11, 2000

[54] LOW DENSITY RIGID POLYURETHANE FOAMS HAVING IMPROVED SUBSTRATE ADHENSION CHARACTERISTICS

[75] Inventors: Robert S. Coleman, Livonia; Allan H. Syrop, Farmington Hills, both of Mich.

[73] Assignee: BASF Corporation, Mt. Olive, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,936

[22] Filed: Oct. 23, 1997

[51] Int. Cl.[7] .................................................. C08G 18/04
[52] U.S. Cl. .......................... 521/128; 521/129; 521/131; 521/155; 521/159; 521/170; 521/174
[58] Field of Search .................................... 521/128, 129, 521/131, 155, 159, 170, 174

[56] References Cited

U.S. PATENT DOCUMENTS

| | | |
|---|---|---|
| 5,104,907 | 4/1992 | Yoshimura . |
| 5,216,040 | 6/1993 | Kuroishi . |
| 5,262,447 | 11/1993 | Tucker . |
| 5,430,071 | 7/1995 | Green et al. . |
| 5,451,614 | 9/1995 | Green et al. . |
| 5,561,172 | 10/1996 | Omure et al. ............................ 521/170 |

FOREIGN PATENT DOCUMENTS

| | | |
|---|---|---|
| 0 443 158A2 | 8/1991 | European Pat. Off. . |
| 0 626 399A1 | 11/1994 | European Pat. Off. . |

*Primary Examiner*—John M. Cooney, Jr.
*Attorney, Agent, or Firm*—Fernando A. Borrego

[57] ABSTRACT

The present invention relates to polyurethane foams employing an imidazole compound having enhanced substrate adhesion characteristics at relatively low mold temperatures. Additionally, the present invention relates to resin compositions employed in the polyurethane foams and methods of producing polyurethane foams employing the resins.

31 Claims, No Drawings

LOW DENSITY RIGID POLYURETHANE FOAMS HAVING IMPROVED SUBSTRATE ADHENSION CHARACTERISTICS

FIELD OF THE INVENTION

The present invention relates to polyurethane foams and, more particularly, to low density rigid polyurethane foams having improved substrate adhesion characteristics at relatively low mold temperatures. The molded foams of the present invention may be characterized as having densities of less than about 4.0 pcf, generally.

BACKGROUND OF THE INVENTION

Polyurethane foams are employed in many applications in various industries including for example the refrigeration equipment industry. Illustrative applications include coolers, refrigeration panels, and various types of insulation, among others. In general, low density; rigid polyurethane foams for use in such applications are prepared by reacting an organic isocyanate with a component having at least one isocyanate reactive group, in the presence of a catalyst, blowing agent, and various other additives or reactants. Upon formation of the foam, often the foams are adhered to a desired substrate in order to form a useful product.

Until recently, the blowing agent employed in the production of such foams generally included the use of chlorofluorocarbons (CFC's), optionally with other blowing agents. However, in view of the potential environmental impact of chlorofluorocarbon blowing agents, alternatives are necessary which do not sacrifice the quality of the resulting products. Further, as noted in U.S. Pat. No. 5,430,071 to Green et al., which is hereby incorporated by reference, the flow characteristics of a foaming mixture become extremely important when a blowing agent which instantly volatilizes at atmospheric pressure and temperature is employed. This volatility often causes the foam to froth at the mixing head, which makes it difficult to evenly flow throughout a mold cavity.

Still another important consideration with regard to foams, and particularly low density foams are their surface adhesion characteristics. While many low density rigid foam formulations are known to offer good adhesion characteristics at processing temperatures above approximately 80° F., surface friability tends to become a problem along the foam surface at temperatures below about 80° F. This perceived problem becomes even more pronounced as the processing temperatures fall significantly below 80° F., i.e. between about 65° F. to 75° F. As should be understood by those skilled in the art, surface friability has a dramatic effect on the adhesive characteristics of the foam. In general, the adhesive character of the foam decreases as the friability increases such that the foam will not adhere to the substrate without preapplying adhesives to the substrate itself, which is costly.

Foam molds and equipment operated at temperatures of at least about 80° F. and up to about 110° F. can add significantly to processing costs due to the energy required to heat the mold. Worse yet, a significant segment of the foam manufacturing industry does not have the equipment necessary to heat mold fixtures and substrates above 80° F. as this equipment is often very costly.

Adhesion problems tend to occur with systems using low levels, i.e. less than 10.0%, especially less than 5.0% by weight of the system of HFC or HCFC as blowing agents. While low levels of HCFC and HFC blowing agents have been known to lead to adhesion problems, the use of low level amounts is highly desirable from a cost standpoint. Adhesion problems such as result from surface friability also tend to occur when high water levels are employed, i.e. more than about 3.0 weight percent for the resin and/or 1.5 weight percent based on the foam system. Thus, low water levels should be employed when possible.

SUMMARY OF THE INVENTION

In view of the foregoing, it is a primary object of the present invention to provide foam formulations, and particularly low density rigid frothing foams, which are processable at temperatures as low as about 65° F. without significantly affecting the surface adhesion characteristics of the resulting foam due to surface frying or other processing factors.

It is another object of the present invention to provide foam formulations which can be effectively blown with blowing agents other than chlorofluorocarbons (CFC's).

It is a further object of the present invention to provide a polyol composition useful for the production of low density rigid polyurethane foams which are processable at temperatures as low as about 65° F.

It is still another object of the present invention to provide a polyol composition with a relatively low average hydroxyl number which yields a frothing foam mixture with good flow characteristics and dimensional stability.

It is yet another object of the present invention to provide resin blends and/or polyurethane systems having low levels of HCFC and HFC blowing agents without sacrificing adhesion properties. Still another object of the present invention is to provide a process for making a low density rigid polyurethane foam in combination with a substrate exhibiting improved dimensional stability and adhesion characteristics.

These and other objects are satisfied by the compositions of the present invention wherein the low density, rigid polyurethane foam comprises the reaction product of: (a) a polyisocyanate component; (b) an isocyanate reactive component having at least two isocyanate reactive hydrogens in the presence of; (c) a blowing agent selected from the group consisting of hydrofluorocarbons, hydrochlorofluorocarbons and mixtures thereof along with water; (d) a catalyst including an imidazole compound; and (e) optionally, chain extenders, surfactants, flame retarding agents, stabilizers, plasticizers, fillers and mixtures thereof. Preferably, the imidazole compound will be methyl imidazole.

The invention also provides a resin composition useful in the preparation of low density, rigid polyurethane foams which are processable at temperatures as low as about 65° F. comprising: (a) an isocyanate reactive component having at least two isocyanate reactive hydrogens; (b) a blowing agent selected from the group consisting of hydrofluorocarbons, hydrochlorofluorocarbons and mixtures thereof along with water; (c) a catalyst including an imidazole compound; and (d) optionally, chain extenders, surfactants, flame retarding agents, stabilizers, plasticizers, fillers and mixtures thereof.

The invention also provides a method for forming the polyurethane foams employing the formulations of the present invention.

As a result of utilizing imidazole which is normally employed in foam formulations to control the rate of reaction between the isocyanate and B side components, it was surprising to find that the imidazole promotes surface cure, excellent adhesion and is believed to lower the processing range temperatures for various foam formulations as described herein.

DETAILED DESCRIPTION OF THE PREFERRED EMBODIMENT

The present invention generally relates to compositions for forming low density, rigid polyurethane foams at temperatures as low as about 65° F. comprising a polyisocyanate "A" side and a "B" side composition. Generally, the "B" component is in the form of a resin blend, which is sufficiently reactive with the polyisocyanate to cause the foaming to occur.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3-and 1,4- cyclohexane diisocyanate as well as any mixtures of these isomers, 1-isocyanate-3,3,5-trimethyl-5-isocyanatomethylcyclohexane(isophoronediisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures.

Highly preferred isocyanates preferably include aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, ailophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and 4,4'-diphenylmethane diisocyanate, polymeric MDI, 2,4'- and/or 2,6-toluene diisocyanate.

Preferably the polyisocyanate component employed in the polyurethane foams of the present invention will have an average viscosity of less than 1000 centipoise at 25° C.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

The B side of the composition, which generally is in the form of a resin blend, includes an isocyanate reactive component having at least two isocyanate reactive hydrogens. Preferably the isocyanate reactive component is in the form of a polyol or blend of polyols having a number average molecular weight of greater than 400. The compounds having at least two isocyanate active hydrogens generally have an average hydroxyl number ranging from 150 to 800 mgKOH/g. In a preferred embodiment, however, the average hydroxyl number is less than 400 and the average functionality is greater than 3.5, and more preferably, the average hydroxyl number is 350 or less and the average functionality is 4.0 or more. These average hydroxyl numbers are unusual in that the typical rigid polyurethane foam is made with polyols whose average hydroxyl number exceeds 400 so as to provide the rigidity and structural strength necessary to make a dimensionally stable foam. However, in the present invention, a dimensionally stable foam is provided with a polyol combination that has a low average hydroxyl number. Further, by providing a low average hydroxyl number, the flow characteristics of the froth foaming mixture are enhanced, and less isocyanate is consumed at any given isocyanate index. It is to be understood that compounds having at least two isocyanate active hydrogens whose ;hydroxyl numbers exceed 400 can be employed so long as the average hydroxyl number of all such compounds is less than 400.

Examples include polythioether polyols, polyester amides and polyacetals containing hydroxyl groups, aliphatic polycarbonates containing hydroxyl groups, amine terminated polyoxyalkylene polyethers, and preferably, polyester polyols, polyoxyalkylene polyether polyols, and graft dispersion polyols. In addition, mixtures of at least two of the aforesaid polyols can be used as long as the combination has an average hydroxyl number in the aforesaid range.

The term "polyester polyol" as used in this specification and claims includes any minor amounts of unreacted polyol remaining after the preparation f the polyester polyol and/or unesterified polyol (e.g., glycol) added after the preparation of the polyester polyol. The polyester polyol can include up to about 40 weight percent free glycol.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include suberic acid, azelaic acid, sebacic acid, decanedicarboxylic acid, maleic acid, fumaric acid phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di-esters of alcohols with 1 to 4 carbons, or dicarboxylic acid anhydrides. Dicarboxylic acid mixtures of succinic acid, glutaric acid and adipic acid in quantity ratios of 20–35: - 35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4- butanediol, 1,5-pentanediol, and 1,6-hexanediol. Furthermore, polyester polyols of lactones, e.g., ecaprolactone or hydroxycarboxylic acids, e.g., aromatic or preferably aliphatic polycarboxylic acids and/or derivatives thereof and multivalent alcohols in the absence of catalysts or preferably in the presence of esterification catalysts, preferably in an atmosphere of inert gases and at temperatures of 150° to 250° C. Examples of suitable esterification catalysts include iron, cadmium, cobalt, lead, zinc, antimony, magnesium, titanium and tin catalysts in the form of metals, metal oxides or metal salts. However, the polycondensation may also be performed in liquid phase in he presence of diluents and/or chlorobenzene for aziotropic distillation of the water of condensation.

The aromatic polyester polyols can be prepared from substantially pure reactant materials as well as more complex ingredients, such as the side stream, waste or scrap residues from the manufacture of phthalic acid, terephthalic acid, dimethyl terephthalate, polyethylene terephthalate, and the like. Compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) therephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Other materials containing phthalic acid residues are polyalkylene therephthalates, especially polyethylene terephthalate (PET), residues or scraps. Still other residues are DMT process residues, which are waste or scrap residues from the manufacture of dimethyl terephthalate (DMT).

Polyoxyalkylene polyether polyols, which can be obtained by known methods, are preferred for use as the polyhydroxyl compounds. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyetheylene glycols, and copolymer glycols prepared from blends or sequential addition of two or more alkylene oxides. The polyalkylene polyether polyols may be prepared by any known process such as, for example, the process disclosed by Wurtz in 1859 and Encyclopedia of Chemical Technology, Vol. 7, pp. 257–262, published by lnterscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1- trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4 hydroxyphenyl)-propane, commonly known as Bisphenol A.

Suitable organic amine initiators which may be condensed with alkylene oxides include aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, paminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, ethanolamine, diethanolamine, N-methyl and N-ethylethanolamine, N-methyl-and N-ethyldiethanolamine, triethanolamine, triisopropanolamine, 1,3-diaminopropane, 1,3-diaminobutane, and 1,4-diaminobutane. Preferable amines include mono- and diethanolamine, vicinal toluenediamines, ethylenediamines, and propylenediamine. in a particularly preferred embodiment, at least one of the polyether polyols employed is initiated with an initiator containing or consisting of an aliphatic amine, and more preferably, all of the polyols used are initiated with an initiator containing an amine, most preferably an aliphatic amine. It is to be understood that the polyols initiated by an amine can also be initiated with a polyhydric alcohol, such as when a mixed initiator of an aliphatic amine/polyhydric alcohol is used like an amine/sucrose package.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with dihydric alcohol or an alkylene oxide such as those disclosed above.

Suitable aliphatic thiols which may be condensed with alkylene oxides include alkanethiols containing at least two—SH groups such as 1,2-ethanedithiol, 1,2-propanedrthiol, 1,2-propanedithiol, and 1,6-hexanedithiol; alkene thiols such as 2-butene-1,4-dithiol; and alkyne thiols such as 3-hexyne-1,6-dithiol.

Hydroxyl-functional and amine-functional chain extenders are also considered useful and include hydroxyl-functional chain extenders such as ethylene glycol, glycerine, trimethylolpropane, 1,4-butanediol, propylene glycol, dipropylene glycol, diethylene glycol, 1,6-hexanediol, and the like; and amine-functional chain extenders such as the sterically hinder diethyltoluene diamine and the other hindered amines disclosed in Weber U.S. Pat. No. 4,218,543; phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine. In low density polyurethane forms, the amount of chain extender is generally less than 30 weight percent based on the total weight of the resin component, preferably less than 25 weight percent.

In the polyurethane foam systems of the present invention, a blowing agent is also necessary. Examples of such blowing agents include the volatile non-halogenated hydrocarbons having two to seven carbon atoms such as alkanes, alkenes, cycloalkanes having up to 6 carbon atoms, dialkyl ethers, cycloalkylene ethers and ketones; hydrochlorofluorocarbons (HCFC's); hydrofluorocarbons (HFC's); perfluorinated hydrocarbons (HFC's); fluorinated ethers (HFC's); and decomposition products.

Examples of volatile non-halogenated hydrocarbons include linear or branched alkanes, e.g. butane, isobutane, 2,3 dimethylbutane, n- and isopentane and technical-grade pentane mixtures, n- and isohexanes, n- and isoheptanes, n- and isooctanes n- and isohexanes, n- and isoheptanes, n- and isoundecanes, and n- and isododecanes. Since very good results are achieved with respect to the stability of emulsions, the processing properties of the reaction mixture and the mechanical properties of polyurethane foam products produced when n-pentane, isopentane or n-hexane, or a mixture thereof is used, these alkanes are preferably employed. Furthermore, specific examples of alkenes are 1-pentene, 2-methylbutane, 3-methylbutene, and 1-hexene, of cycloalkanes are cyclobutane, preferably cyclopentane, cyclohexane or mixtures thereof, specific examples of linear or cyclic ethers are dimethyl ether, methyl ethyl ether, vinyl methyl ether, vinyl ethyl ether, divinyl ether, tetrahydrofuran and furan, and specific examples of ketones are acetone, methyl ethyl ketone and cyclopentanone.

Hydrochlorofluorocarbon blowing agents include 1-chloro-1,2-difluoroethane; 1-chloro-2,2-difluoroethane (142a); 1-chloro-1,1-difluoroethane (142b); 1,1-dichloro-1fluoroetro-1,2difluoroethane; 1-chloro-1,1,2,2-tetrafluoroethane (124a); 1-chloro-1,2,2,2-tetrafluorothane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-113a); chloroheptafluoropropane (HCFC-217); chlorodifluoroethylene (HCFC-1122); and trans-chlorofluoroethylene (HCFC-1131).

Suitable hydrofluorocarbons include difluoromethane (HFC-32); 1,1,1,2-tetrafluoroethane(HFC-134a); 1,1,2,2-tetrafluoroethane(HFC-134); 1,1-difluoroethane (HFC-152a); 1,2-difluoroethane (HFC-142), trifluoroethane; 1,1,2-trifluoroethane; fluoroethane (R-161); 1,1,1,2,2-pentafluoropropane; pentafluoropropylene (R-2125a); 1,1,1,3-tetrafluoropropane;tetrafluoropropylen (R-2134a) ;difluoropropylene(R2152b); 1,1,2,3,3-pentafluoropropane; and 1,1,1,3,3-pentafluoro-n-butane.

Preferred blowing agents include hydrofluorocarbons (HFC's), hydrochlorofluorocarbons (HCFC's), in conjunction with a limited amount of water (less than 3.0% by weight for the resin and 1.5% by weight for the foam system), air, tertiary alcohols orformic acid, for example. Particularly preferred hydrofluorocarbons and hydrochlorofluorocarbons are R-134a and HCFC-22 which are non-flammable and have a relatively low toxicity, i.e. TLV≈1000 ppm.

While the vapor pressure of HCFC-22 alone is high enough that pressure containment equipment may be required (approximately 121 psig at 70° F.), surprisingly, polyol solutions including up to about 30 weight percent HCFC-22 based on the total weight of the polyol component exhibit vapor pressures as low as 40 to 50 psig, depending on the type of polyol employed. Thus, it is preferably that the blowing agent is blended with the polyol component, if HCFC-22 is employed, prior to reaction with the polyisocyanate. When used in combination with water only, the HCFC's and HFC's are generally used in amounts of up to about 20 weight percent.

The total amount of blowing agent employed, particularly the amount of HCFC and HFC blowing agents contained in the resin formulation of the present invention will preferably range from about 5.0 weight percent to about 30.0 weight percent of the resin or B side. More preferably, the range will be from about 8.0 to about 20.0 weight percent of the resin. Of course, the total amount of HCFC's and/or HFC's employed will be reduced proportionately based on the amounts of other blowing agents employed.

The water employed as a co-blowing agent reacts with the organic isocyanate to produce urea linkages and liberate carbon dioxide gas. Thus, the amount of water is preferably below about 3.0 weight percent on the weight of the resin or B side component, and preferably 2.3 weight percent or less, more preferably 2.0 weight percent or less, based on the weight of the resin composition. As little as 0.1 weight percent water may be employed for many of the resin compositions considered useful herein. Based on the weight of the foaming mixture, the amount of water is below about 1.5 weight percent, preferably 1.25 weight percent or less, and still more preferably below about 1.0 weight percent. On the low end as little as 0.05 weight percent water may be employed for the foam system, for example.

Included as part of the B side component of the present invention is an imidazole compound. More particularly, imidazole compound will be present in an amount of about 0.003 to about 0.3 weight percent, more preferably between about 0.04 to about 0.2 weight percent and still more preferably between about 0.045 to about 0.15 weight percent based on the total weight of the resin. A highly preferred imidazole compound is 1 methyl imidazole.

Catalysts may be employed in association with the imidazole compound, which greatly accelerate the reaction of the compounds containing hydroxyl groups and with modified or unmodified polyisocyanates. Examples of suitable compounds are cure catalysts which also function to shorten tack time, promote green strength, and prevent foam shrinkage. Suitable cure catalysts are organometallic catalysts, preferably organorin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–2- carbon atoms, e.g., diethyltin diacetate, dibutyltin diacetate, dibutyltin diacetate, dibutyltin dilaurate, dibutyltinmaleate, dihexyltin diacetate, and dioctyltin diacetate. Other suitable organotin catalysts are organotin aloxides and mono or polyalkyl (1–8C) tin (IV) salts of inorganic compounds such as butyltin trichloride, dimethyl- and diethyl- and dibutyl- and diocryl- and diphenyl-tin oxide, dibutyltin dibutoxide, di(2-ethylhexyl) tin oxide. Preferred, however, are tin catalysts with tin-sulfur bonds which are resistant to hydrolysis, such as dialkyl (1–20C) tin dimercaptides, including dimethyl-, dibutyl-, and dioctyl- tin dimercaptides. Tertiary amines also promote urethane linkage formation, and include triethylamine, 3-methoxypropyl-dimethylamine, triethylenediamine, tributylamine, dimethylcyclohexylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, zetramethyldiaminoethylether, bis(-dimethylaminopropyl)urea, dimethylpiperazine, 1-methyl-4-dimethylaminoethylpiperazine, 1,2-dimethylimidazole, 1-azabicylo[3.3.0] octane and preferably 1,4-diazabicylo [2.2.2] octane, and alkanolamine compounds, such as triethanolamine, triisopropanolamine, N-methyl- and N-ethyldierhanolamine and dimethylethanolamine.

Examples of suitable organic acid blocked amine gel catalysts which may be employed are the acid blocked amines of triethylenediamine, N-ethyl or methyl morpholine, N,N dimethylamine, N-ethyl or methyl morpholine, N,N dimethylaminoethyl morpholine, N-butylmorpholine, N,N' dimethylpiperazine, bis (dimethylamino-alkyl)-piperazines, 1,2 dimethyl imidazole, dimethyl cyclohexylamine. The blocking agent can be an organic carboxylic acid having 1 to 20 carbon atoms, preferably 1–2 carbon atoms. Examples of blocking agents include 2-ethyl-hexanoic acid and formic acid. Any stoichiometric ratio can be employed with one acid equivalent blocking one amine group equivalent being preferred. The tertiary amine salt of the organic carboxylic acid can be formed in situ, or it can be added to the polyol composition ingredients as a salt. To this end, gusternany ammonium salts are particularly useful.

When catalysts are employed in addition to the imidazole compound, the total amount of catalyst and the imidazole compound taken together should not exceed about 1.0 weight percent of the resin composition. Higher amounts of catalysts may have negative effects on many processing characteristics such as an undesirably high rate of reaction, for example.

The polyol composition or B side component optionally contains a flame retardant. Examples of suitable phosphate flameproofing agents are tricresyl phosphate tris(2-chloroethyl)phosphate, tris(2-chloropropyl) phosphate, and tris(2,3-dibromopropyl) phosphate. In addition to these halogen substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, molybdenum trioxide, ammonium molybdate, ammonium phosphate, pentabromodiphenyloxide, 2,3-dibromopropanol, hexabromocyclododecane, dibromoethyidibromocyclohexane, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 40 weight percent, preferably from 5 to 20 weight percent, of said flameproofing agents may be used based on the weight of the resin composition.

Examples of suitable surfactants are compounds which serve to support homogenization of the starting materials and may also regulate the cell structure of the plastics. Specific examples are salts of sulfonic acids, e.g., alkali metal salts or ammonium salts of fatty acids such as oleic or stearic acid, of didecylbenzene or dinaphthylmethanedisulfonic acid, and ricinoleic acid, foam stabilizers, such as siloxaneoxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5 wt. %, based on the weight of the resin composition.

Hydroxyl-functional -and amine-functional chain extenders are also useful and include hydroxyl-functional chain extenders such as ethylene glycol, glycerine, trimethylolpropane, 1,4-butanediol, propylene glycol, dipropylene glycol, 1,6-hexanediol, and the like; and amine-functional chain extenders such as the sterically hinder diethyltoluene diamine and the other hindered amines disclosed in Weber U.S. Pat. No. 4,218,543; phenylene diamine, 1,4-cyclohexane-bis-(methylamine), ethylenediamine, diethylenetriamine, N-(2-hydroxypropyl)-ethylenediamine,N,N'-di(2-hydroxypropyl) ethylenediaminepiperazine, and 2-methylpiperazine.

The following examples are illustrative of the embodiments of the present invention and are not intended to limit the description of the invention.

| | |
|---|---|
| Polyol A | a propylene oxide adduct of a sucrose/glycerine mixture having a pH of 6.5 and nominal hydroxyl number of 360. |
| Polyol B | a propylene oxide adduct of a sucrose/glycerine mixture having a pH of 6.5 and nominal hydroxyl number of 530. |

-continued

| | |
|---|---|
| Polyol C | a polyester polyol having a pH of 6.5 and a nominal hydroxyl number of 250. |
| Plasticizer | propylene carbonate available from Arco Chemical. |
| PCF | is Fyrol PCF, a flame retardant available from Akzo Chemical. |
| B-8462 | is a silicone surfactant commercially available from Goldschmidt Chemical. |
| Dabco BL-17 | is an acid-blocked version of BL-11 which is 70% Bis(dimethylaminoethyl) ether in 30% dipropylene glycol (DPG), commercially available from Air Products. |
| Dabco 81 54 | is a 2-ethyl-hexanoic acid blocked triethylene diamine, commercially available from Air Products. |
| Blowing Agent | HCFC-22 (monochlorodifluoromethane) |
| ISO A | polymethylene polyphenylene polyisocyanate having a typical viscosity of about 200, an NCO content of 31.5% and a nominal average functionality of 2.7 |

| | Percent by Weight | | | |
|---|---|---|---|---|
| Components | Sample 1 | Sample 2 | Sample 3 | Sample 4 |
| Polyol A | 44.90 | 45.00 | 45.10 | 44.9 |
| Polyol B | 20.00 | 20.00 | 20.00 | 20.00 |
| Polyol C | 15.00 | 15.00 | 15.00 | 15.00 |
| Plasticizer | 3.60 | 3.60 | 3.60 | 3.60 |
| PCF | 12.00 | 12.00 | 12.00 | 12.00 |
| B-8462 | 1.75 | 1.75 | 1.75 | 1.75 |
| Dabco BL-17 | 0.50 | 0.40 | 0.30 | 0.50 |
| Dabco 8154 | 0.25 | .020 | 0.15 | 0.10 |
| 1-methyl imidazole | — | 0.05 | 0.10 | 0.15 |
| Water | 2.00 | 2.00 | 2.00 | 2.00 |
| Total | 100.00 | 100.00 | 100.00 | 100.00 |
| HCFC-22 Percent in resin | 10.00 | 10.00 | 10.00 | 10.00 |
| ISOA | 100 | 100 | 100 | 100 |
| INDEX | 116 | 116 | 116 | 116 |
| Weight ratio of ISO/Form | 100/93 | 10/93 | 100/93 | 100/93 |

Verification Test Procedure:

Utilizing standard foaming equipment the composition of Samples 1–3 above were applied to carbon steel panels (2'×2'×3/32") maintained at 70° F. The foaming compositions were applied starting at one end of the panel and moving the dispensing head with an even motion to the other end of the panel. The foam was then allowed to cure for ten minutes.

To test for surface cure, each sample was pressed by hand, particularly at the substrate/foam interface. Foams having the desired characteristics exhibit any of the friable foam characteristics, tend to be resilient to external pressures, whereas friable foams tend to be crunchy, brittle and powdery which is indicative of poor surface curing and adhesion characteristics.

After thirty minutes, the foam is pulled away from the carbon steel substrates to check for foam/substrate adhesion. Foams with poor adhesion will pull away from the substrate with minimal effort, leaving very little foam attached to the substrate. If any foam remains, it is primarily located on the outer edges of the foam/substrate contact areas. Foams with good adhesion require a great deal of force to separate the foam from the substrate and leave a large amount of foam attached in a relatively uniform pattern over the interface area.

The foam prepared without the 1-methyl imidazole (Sample 1) clearly exhibited friable foam characteristics and very little adhesion at the 70° F. substrate conditions.

In contrast, the foams prepared with the 1-methyl imidazole (Samples 2–4) did not exhibit any of the friable characteristics of Sample 1 and showed good adhesion to the substrate at the 70° F. substrate conditions.

Thus, the use of imidazole in the foam formulations of the present invention have led to the surprising discovery that the imidazole promotes surface cure of the form, wherein the foam is noon-friable, has excellent adhesion characteristics and extends the lower allowable processing range from about 80° F. to about 65° F.

While it will be apparent that the preferred embodiments of the invention disclosed are well calculated to fulfill the objects stated, it will be appreciated that the invention is susceptible to modification, variation and change without departing from the spirit thereof.

We claim:

1. A low density, rigid polyurethane foam comprising the reaction product of:
   (a) a polyisocyanate component with;
   (b) an isocyanate reactive component having at least two isocyanate reactive hydrogens in the presence of;
   (c) a blowing agent comprising water and a hydrofluorocarbon, hydrochlorofluorocarbon, or a mixture thereof;
   (d) a surface friability reducing and adhesion promoting imidazole component in an amount of from about 0.003 to about 0.3 weight percent based on the total weight of components (b)–(e); and
   (e) optionally, catalysts, chain extenders, surfactants, flame retarding agents, stabilizers, plasticizers, fillers and mixtures thereof, wherein the amount of water is below about 3.0 weight percent, based on the total weight of components (b)–(e).

2. The polyurethane foam of claim 1, wherein the imidazole compound is 1-methyl imidazole.

3. The polyurethane foam of claim 1, wherein said catalyst is present in an amount up to about 1.0 weight percent based on the total weight of components (b)–(e).

4. The polyurethane foam of claim 1, wherein the imidazole compound is present in an amount ranging from about 0.04 to about 0.2 weight percent based on the total weight of components (b)–(e).

5. The polyurethane foam of claim 1, wherein the imidazole compound is present in an amount ranging from about 0.045 to about 0.15 weight percent based on the total weight of components (b)–(e).

6. The polyurethane foam of claim 1, wherein said blowing agent consists essentially of water and HCFC-22.

7. The polyurethane foam of claim 1, wherein said blowing agent is present in an amount between about 5.0 to about 30.0 weight percent based on the total of components (b)–(e).

8. The polyurethane foam of claim 7, wherein said blowing agent is present in an amount between about 8.0 to about 20.0 weight percent based on the total of components (b)–(e).

9. The polyurethane foam of claim 1, wherein said foam is processable at temperatures above about 65° F. with minimal, if any, surface frying.

10. A resin composition useful for the production of polyurethane foams comprising:
   (a) an isocyanate reactive component having one or more isocyanate reactive hydrogens;
   (b) a blowing agent comprising water and a hydrofluorocarbon, hydrochlorofluorocarbon, or mixtures thereof;
   (c) a surface friability reducing and adhesion promoting imidazole compound in an amount of from about 0.003 to about 0.3 weight percent based on the total weight of components (a)–(d); and (d) optionally, catalysts, chain extenders, surfactants, flame retarding agents, stabilizers, plasticizers, fillers and mixtures thereof, wherein the amount of water is below about 3.0 weight percent, based on the total weight of the resin composition.

11. The resin composition of claim 10, wherein the imidazole compound is 1-methyl imidazole.

12. The resin composition of claim 11, wherein said catalyst is present in an amount up to about 1.0 weight percent based on the total weight of components (b)–(e).

13. The resin composition of claim 11, wherein the imidazole compound is present in an amount ranging from about 0.04 to about 0.2 weight percent based on the total weight of components (b)–(e).

14. The resin composition of claim 11, wherein the imidazole compound is present in an amount ranging from about 0.045 to about 0.15 weight percent based on the total weight of components (b)–(e).

15. The resin composition of claim 10, wherein said blowing agent consists essentially of water and HCFC-22.

16. The resin composition of claim 10, wherein said blowing agent is present in an amount between about 5.0 and about 30.0 weight percent based on the total of components (b)–(e).

17. The resin composition of claim 16, wherein said blowing agent is present in an amount between about 8.0 and about 20.0 weight percent based on the total of components (b)–(e).

18. A method of producing polyurethane foams comprising reacting:

(a) a polyisocyanate component with;

(b) an isocyanate reactive component having at least two isocyanate reactive hydrogens in the presence of;

(c) a blowing agent comprising water and hydrofluorocarbons, hydrochlorofluorocarbons or mixtures thereof;

(d) a surface friabity reducing and adhesion promoting imidazole compound in an amount of from about 0.003 to about 0.3 weight percent based on the total weight of components (b)–(e); and (e) optionally, catalysts, chain extenders, surfactants, flame retarding agents, stabilizers, plasticizers, fillers and mixtures thereof, wherein the amount of water is below about 3.0 weight percent, based on the total weight of components (b)–(e).

19. The method of claim 18, wherein the imidazole compound is 1-methyl imidazole.

20. The method of claim 18, wherein said catalyst is present in an amount up to about 1.0 weight percent based on the total weight of components (b)–(e).

21. The method of claim 18, wherein the imidazole compound is present in an amount ranging from about 0.04 to about 0.2 weight percent based on the total weight of components (b)–(e).

22. The method of claim 18, wherein the imidazole compound is present in an amount ranging from about 0.045 to about 0.15 weight percent based on the total weight of components (b)–(e).

23. The method of claim 18, wherein said blowing agent consists essentially of water and HCFC-22.

24. The method of claim 18, wherein said blowing agent is present in an amount between about 5.0 and about 30.0 weight percent based on the total of components (b)–(e).

25. The resin composition of claim 18, wherein said blowing agent is present in an amount between about 8.0 and about 20.0 weight percent based on the total of components (b)–(e).

26. A polyurethane foam as defined in claim 1, wherein said isocyanate reactive component comprises polyols having an average hydroxyl number less than 400 and an average functionality greater than 3.5.

27. A polyurethane foam as defined in claim 26, wherein said isocyanate reactive component includes at least one polyether polyol and a polyester polyol.

28. A resin composition as defined in claim 10, wherein said isocyanate reactive component comprises polyols having an average hydroxyl number less than 400 and an average functionality greater than 3.5.

29. A resin composition as defined in claim 28, wherein said isocyanate reactive component includes at least one polyether polyol and a polyester polyol.

30. A method as defined in claim 18, wherein said isocyanate reactive component comprises polyols having an average hydroxyl number less than 400 and an average functionality greater than 3.5.

31. A method as defined in claim 30, wherein said isocyanate reactive component includes at least one polyether polyol and a polyester polyol.

* * * * *